(12) United States Patent
Cheng et al.

(10) Patent No.: US 7,107,258 B2
(45) Date of Patent: *Sep. 12, 2006

(54) SEARCH ENGINE FOR LARGE DATABASE SEARCH USING CAM AND HASH

(75) Inventors: Paul Cheng, San Jose, CA (US);
Nelson L. Chow, Mountain View, CA (US); Fangli Chien, San Jose, CA (US)

(73) Assignee: Integrated Silicon Solution, Inc., Santa Clara, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 10/065,267

(22) Filed: Sep. 30, 2002

(65) Prior Publication Data

US 2003/0033276 A1     Feb. 13, 2003

Related U.S. Application Data

(63) Continuation of application No. 09/927,599, filed on Aug. 9, 2001, now Pat. No. 6,889,225.

(51) Int. Cl.
*G06F 17/30* (2006.01)

(52) U.S. Cl. .............................. 707/3; 707/2; 707/100

(58) Field of Classification Search ................ 707/101, 707/103 R, 3, 2, 100; 709/224; 705/14; 711/158, 216; 370/392; 380/28
See application file for complete search history.

(56) References Cited

U.S. PATENT DOCUMENTS

| | | | | |
|---|---|---|---|---|
| 4,780,810 A | * | 10/1988 | Torii et al. ...................... 712/6 |
| 5,182,799 A | * | 1/1993 | Tamura et al. ............... 711/216 |
| 5,359,720 A | * | 10/1994 | Tamura et al. ............... 711/108 |
| 5,390,359 A | * | 2/1995 | Damerau ........................ 707/3 |
| 5,404,553 A | * | 4/1995 | Komori et al. ............... 712/25 |
| 5,414,704 A | * | 5/1995 | Spinney ...................... 370/389 |
| 6,434,662 B1 | | 8/2002 | Greene et al. ............... 711/108 |
| 6,665,297 B1 | * | 12/2003 | Hariguchi et al. .......... 370/392 |
| 6,889,225 B1 | * | 5/2005 | Cheng et al. ................ 707/100 |

OTHER PUBLICATIONS

Tim Morrs, Antonio Cantoni, Cascading Content-Addressable Memories, 1992, IEE MICRo, pp. 56-66.*
Tim Melchior, Leveraging Very Large Content Addressable Memories, Nov. 12, 1997, UTMC Microelectronic Systems, pp. 1-5.*

* cited by examiner

Primary Examiner—Paul L. Rodriguez
Assistant Examiner—Luke Osborne
(74) Attorney, Agent, or Firm—Raymond E. Roberts; Intellectual Property Law Offices

(57) ABSTRACT

A search engine having a controller, a memory, and at least one hash-CAM (H-CAM). The memory includes a database of search values and associate content or just associate content. The controller uses search values to access the memory to obtain the search results. The H-CAM includes at least one set of paired hash units and CAM units and at least one logic unit. The CAM units hold values known to cause hash collisions in the paired hash units, and the logic unit prioritizes the hash and CAM unit outputs to address values usable to access the memory and obtain a search result at the controller that is not the result of a hash collision. The H-CAM may optionally include a search data storage to store the search values, so that they need not be stored in the memory, and a comparator to determine and handle new search data based hash collisions. The H-CAM may optionally also be cascaded.

26 Claims, 17 Drawing Sheets

FIG. 6
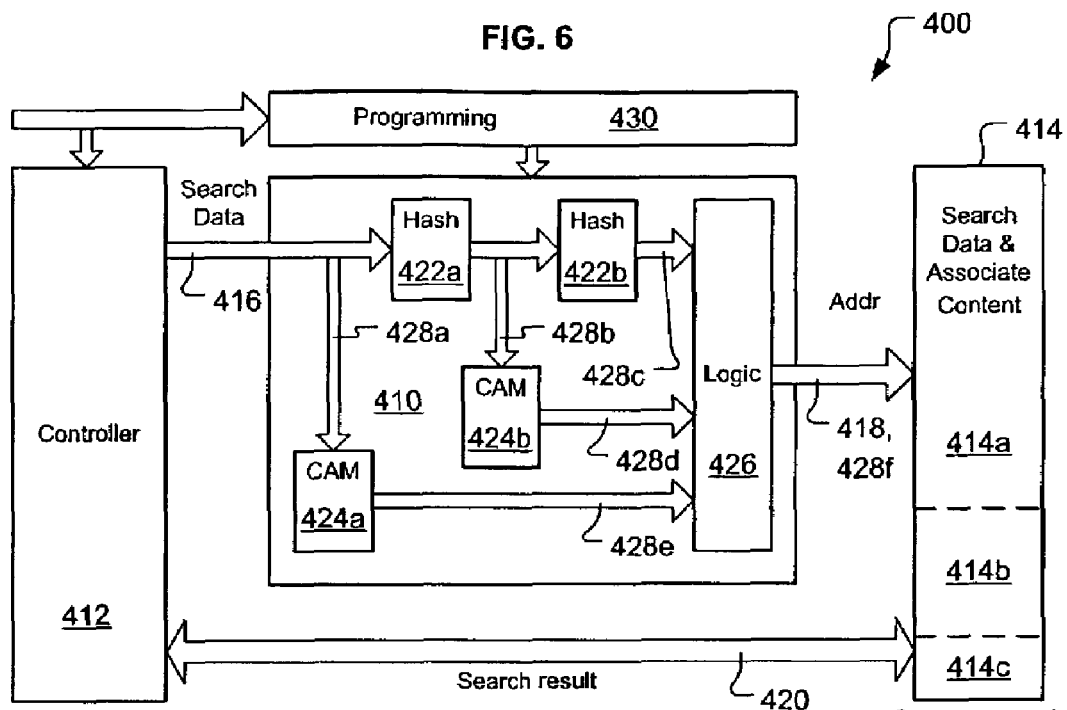
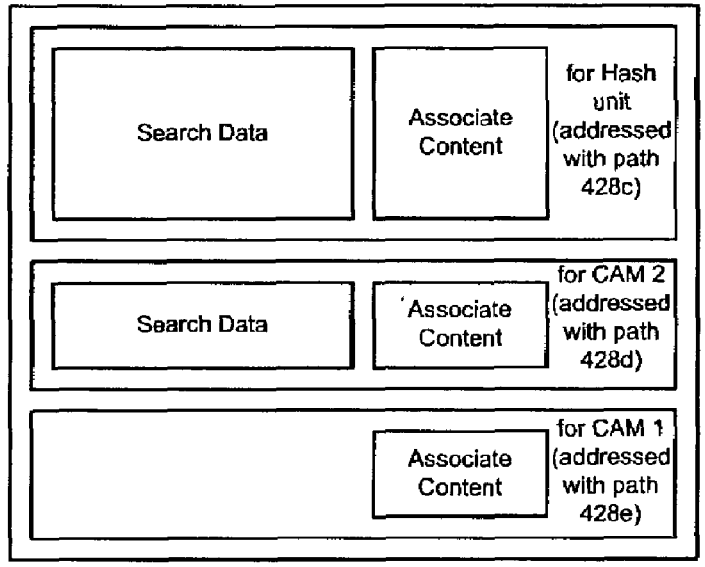
Search Data and Associate content memory for a 2 level Hash-CAM system Notice the memory may be composed of five blocks and three distinct sections.

SEARCH ENGINE FOR LARGE DATABASE SEARCH USING CAM AND HASH

CROSS REFERENCE TO RELATED APPLICATIONS

This is a continuation of application Ser. No. 09/927,599, filed Aug. 9, 2001, now U.S. Pat. No. 6,889,225.

BACKGROUND OF INVENTION

1. Technical Field

The present invention relates generally to static information storage and retrieval systems, and more particularly to architectures for searching large databases of stored data using hash algorithms or associative memory, also referred to as content addressable or tag memory.

2. Background Art

Many real world systems require searching information at very high speed; hence hardware based approaches are often employed. An increasingly common example, and the one which will primarily be used herein, is searching in network systems. In information searching there are basically two types of information searching: exact match and partial match searching. The present invention is intended to solve problems in exact match searching. Two approaches widely used today for exact match searching are hash-based searching and content addressable memory or CAM-based searching.

To compare these two types, for instance, one can consider the problem of designing and searching a database that can support one million entries of 128-bit input data and 32-bit of associated data.

In a hash based search, the concept is to map the search data, which is often very lengthy as in this 128-bit example, to numbers which are often much smaller, say only 20-bits in length, since only 20 bits are needed to address one million entries. Since this conversion (128-bit to 20-bit) is not a one-to-one mapping, collisions will very likely occur. That is, a hash collision is said to have occurred here when the hash function employed returns the same 20-bit result for two different 128-bit inputs.

Furthermore, depending on the particular data encountered and the particular hash function employed, more than just two different 128-bit inputs can be mapped to the same 20-bit result number. It therefore is not uncommon for a system to have to be designed to accommodate the fact that three, four or even more different inputs will be mapped by the hash function to the very same output number. There are many different approaches to reducing the impact of hash collisions. One approach is to increase the database size. For instance, consider first the degenerate case, a "1-way-set-associative hash." Here the 128-bit input search values are mapped to 20-bit values used as address indexes into a memory. The memory needs to be 1M in size, since each 20-bit value needs to map to an actual memory location. This case, of course, does not handle any hash collisions at all. It simply ignores them, and therefore is not very practical. Consider next a "2-way-set-associative hash." Here one set of collisions can be handled. The memory needs to be 2M in size, since each 20-bit value needs to map to two actual memory locations. Higher-way associative hashes can also be used, but beyond a "4-way-set-associative hash" this approach of simply increasing the database size is typically not practical. Based on the parameters used here, in a 4-way case the memory would need to be 4M in size and would be very poorly utilized.

FIG. 1 (background art) is a block diagram depicting a search engine 10 using conventional hash-based database searching. A controller 12 includes a hash function 14 which can receive 128-bit input search values and generate 20-bit hash value which is used as an index to address a memory 16.

If we assume that hash collisions will not happen too often, and use only a 2-way-set-associative hash, the memory 16 needs to be able to store a database having two million entries. This is depicted here as a base region 16a and a conflicts region 16b in the memory 16, a total of two regions for a 2-way-set-associative hash. A 21-bit wide address bus 18 is therefore needed to communicate between the controller 12 and the memory 16 (20-bits to address the first one million entries in the base region 16a, and one additional bit to address the second million entries, in the conflicts region 16b used to support the one set of potential collision cases). The entries in the memory 16 each require 160 bits, 32 bits for an associate value which is the desired result of the search and 128 bits for the input search value which is intended to produce that particular result.

The above illustrates a key point in hash-based database searching—both the associate content value and a stored instance of the search value which produces it must be stored in the memory 16 and returned to the controller 12, here via a 160-bit result bus 20, for the controller 12 to perform a comparison to determine if a hash collision has occurred. The controller 12 can only do this if it has both the input and stored search values. If these are the same in a search result obtained from the base region 16a, the associate value in the search result is valid and the controller 12 can carry on with using it. If these values are different, however, a hash collision has occurred. Then the controller 12 accesses the memory 16 a second time, using the $21^{st}$ bit to address an entry stored in the conflicts region 16b. If the input and stored search values are now the same, the controller 12 can again carry on. If these are still different, however, another hash collision has occurred and using only a 2-way-set-associative hash and a two million entry database is not adequate for the task at hand.

A good hash algorithm is one that produces very few collisions. However, it usually cannot be known how many collisions will actually occur, because the pattern of the input search data is typically not known in advance. If there is more than one collision for a given number, a 2-way-set-associative hash will not be able to handle it. In order to support the database with more confidence, 4-way or more set-associative approach should then be used. When such is used, more memory must be provided.

The size of the memory depends on two things: the number of entries being supported and the number of ways of set-associativity employed. For example, to support n entries using 4-way-set-associativity, the memory size has to have 4n entries. For one million entries this means that the memory must be four million entries "deep," even though only one million of entries will ever potentially be used, i.e., less than 25% of the memory is utilized.

The number of ways of set-associativity also dictates that more clock cycles will potentially be needed for a search. As noted for the 2-way associative hash in FIG. 1, it will take a maximum of two memory read operations (instead of one) to perform a database search, since one collision may happen during the search. Similarly, for an m-way set-associativity it may take up to m memory read operations to perform a database search.

It follows that hash-based database searching has substantial disadvantages when one considers the large amount of memory needed and the limited speed of searching possible. For discussion, these can be termed the memory size issue and the search speed issue, and both increase linearly when hash-based searching is used. The memory size issue is largely a matter of cost, and thus may be easily solved if cost is not a serious problem. The search speed issue is more difficult, however, and it may make hash-based searching impractical in many applications.

FIG. 2 (background art) is a basic block diagram depicting a search engine 50 using conventional CAM-based database searching. Here a controller 52 provides a 128-bit input search value to a CAM 54 that will search its own database (of one million entries) and provide a 20-bit index value to a memory 56, where up to one million 32-bit associate content values may be stored.

Although other types of memory can theoretically be used in place of the CAM 54, content addressable memory, or associative memory as it is also widely known, is particularly useful. When provided an input search value, a content addressable memory will very rapidly provide as its output the address within it of any match (multiple matches should not occur here unless the CAM 54 is improperly programmed). This index, perhaps with appropriate translation by a suitable logic circuit, can then be used as an address into the memory 56.

The controller 52 here provides the input search value to the CAM 54 via a 128-bit wide search data bus 58; the CAM 54 provides the address index value to the memory 56 via a 20-bit wide address bus 60, and the memory 56 provides the search result to the controller 52 via a 32-bit wide result bus 62. Since the CAM 54 always provides, if anything, a unique address in the memory 56, only one read operation is required.

TABLE 1 summarizes, along with aspects of the present invention which are discussed presently, the differences between the prior art hash-based and CAM-based approaches when the controllers 12, 52 are ASIC devices and the memories 16, 56 are RAM. From this a number of respective advantages and disadvantages for these approaches become readily apparent. For instance, the hash-based approach has lower cost and power consumption. The CAM-based approach provides a lower pin count at the ASIC (which is highly desirable), uses less memory (overall), never encounters collisions (no dependency is necessary on the nature of the input data values or on the choice of an algorithm), and has a potentially higher search speed (one which is consistent and known). There are still other advantages and disadvantages, but these are the typical major ones.

Accordingly, it is desirable to find hardware-based approaches of database searching which do not suffer from the respective disadvantages of the conventional hash-based and CAM-based approaches, and which retain or provide additional advantages for these prior art approaches.

SUMMARY OF THE INVENTION

Accordingly, it is an object of the present invention to provide more efficient database search engines.

Another object of the invention is to provide database search engines which employ hash-based techniques yet are less restricted by hash collisions.

And another object of the invention is to provide search engines that are more adaptable and powerful, and thus applicable to great variety of database needs including those of large databases.

Briefly, one preferred embodiment of the present invention is a search engine including a controller able to provide a search value representing a search result. A memory stores a search database of the search results and provides instances of them to the controller. A hash-CAM sub-circuit (H-CAM) includes a hash unit able to receive the search value from the controller and generate a hash output based on it. The H-CAM also includes a CAM unit able to store a CAM database of instances of the search values known to cause hash collisions in the hash unit. The CAM unit receives the search value from the controller and matches it against its CAM database such that a CAM output is provided if a match exists. A logic unit receives the hash output and the CAM output, creates an address value based on the CAM output if a match exists and otherwise creates the address value based on the hash output. The logic unit provides the address value to the memory, wherein the address value represents an address.

An advantage of the present invention is that it provides a direct cost savings due to improved memory utilization, and it provides indirect cost savings due to reduced bus widths, reduced pin counts, reduced circuit and component footprints, and reduced power usage and heat dissipation needs.

Another advantage of the invention is that it is easily implemented within many existing search engine schemes, thus permitting rapid adoption and minimal industry change.

And another advantage of the invention is that its speed equals or betters hash-based prior art, which suffers from poor utilization and limited hash collision handling ability, and the speed of the invention approaches that of the CAM-based prior art, which is expensive.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF DRAWINGS

The purposes and advantages of the present invention will be apparent from the following detailed description in conjunction with the appended tables and figures of drawings in which:

TABLE 1 summarizes differences between the prior art hash-based and CAM-based approaches and a variation of the embodiment of the present invention depicted in FIG. 8;

Figure 7:
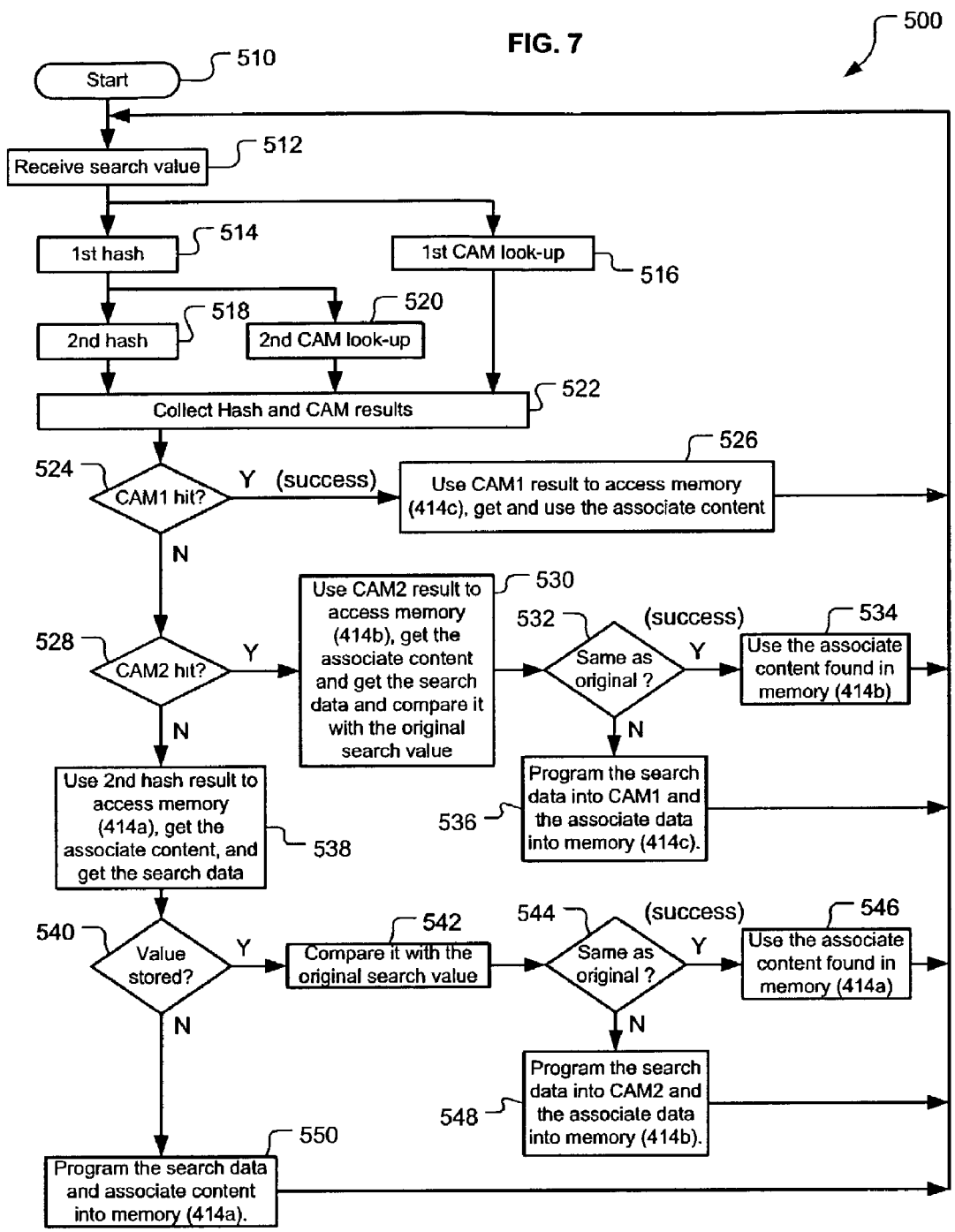

TABLE 2 summarizes inputs and stored values in an example described for the embodiment of the present invention depicted in FIG. 6 and the process for that embodiment depicted in FIG. 7; and TABLE 3 provides a comparison of two different implementations of a one million entry 8-way-set-assoicative hash-based system, wherein one uses a typical prior art hash-based approach and the other uses the H-CAM with the indirect hash pointer and a cascading mechanism of the present invention.

Figure 1:
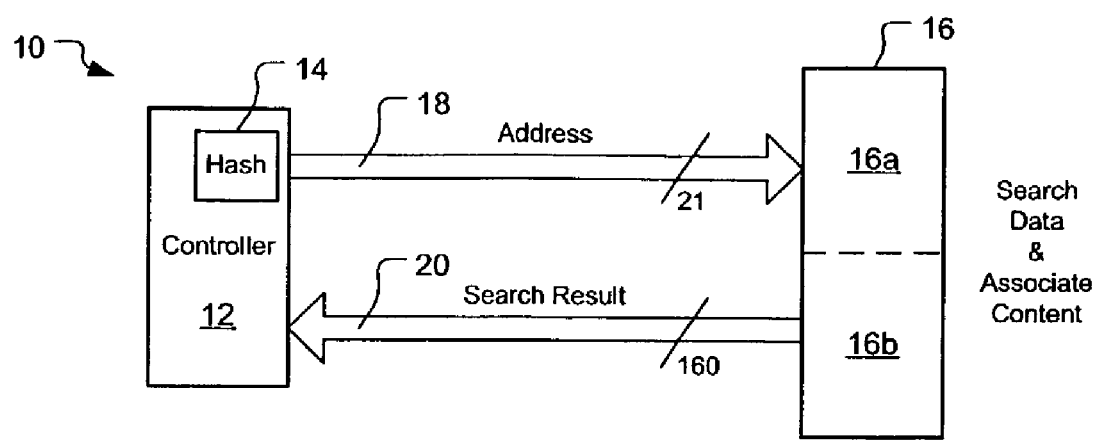
Figure 2:
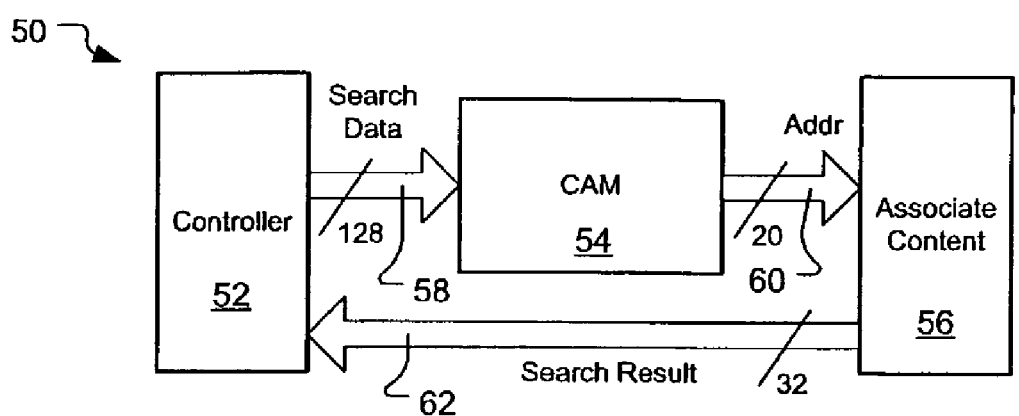
Figure 3:
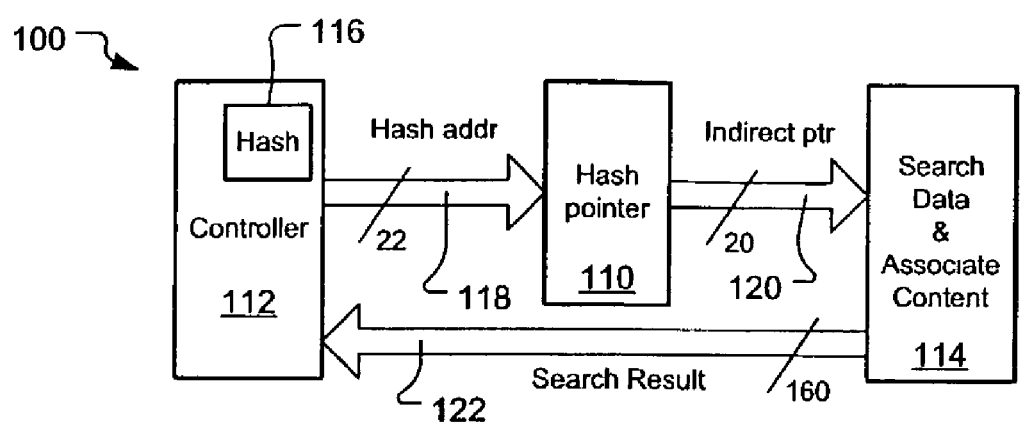
Figure 4:
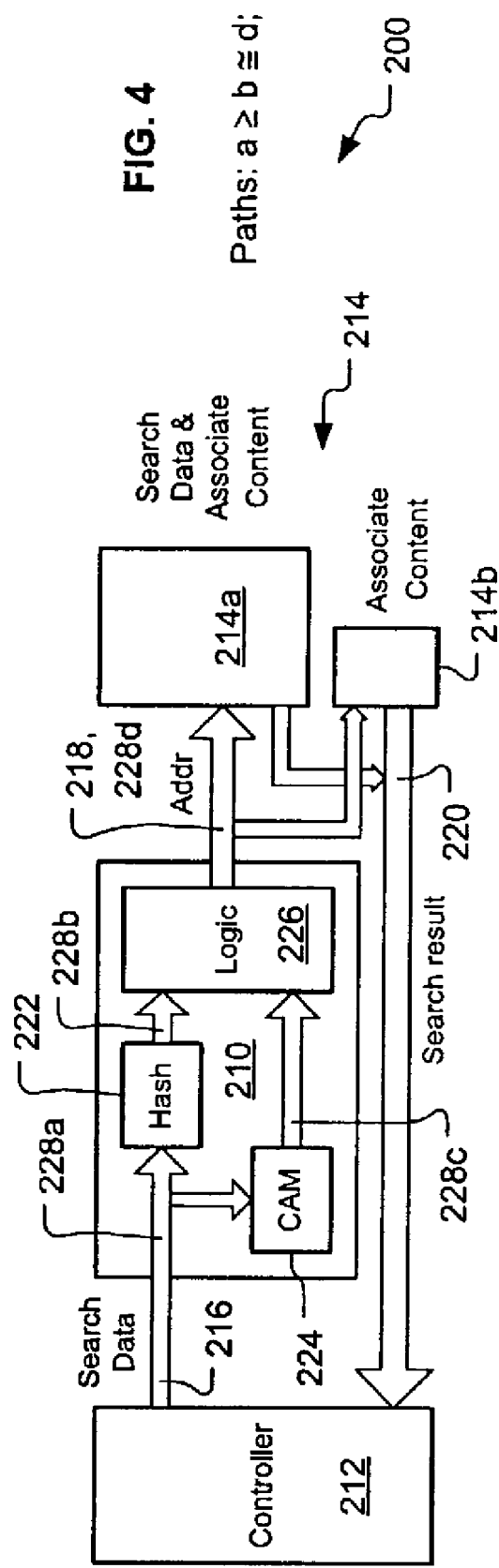
Figure 5:
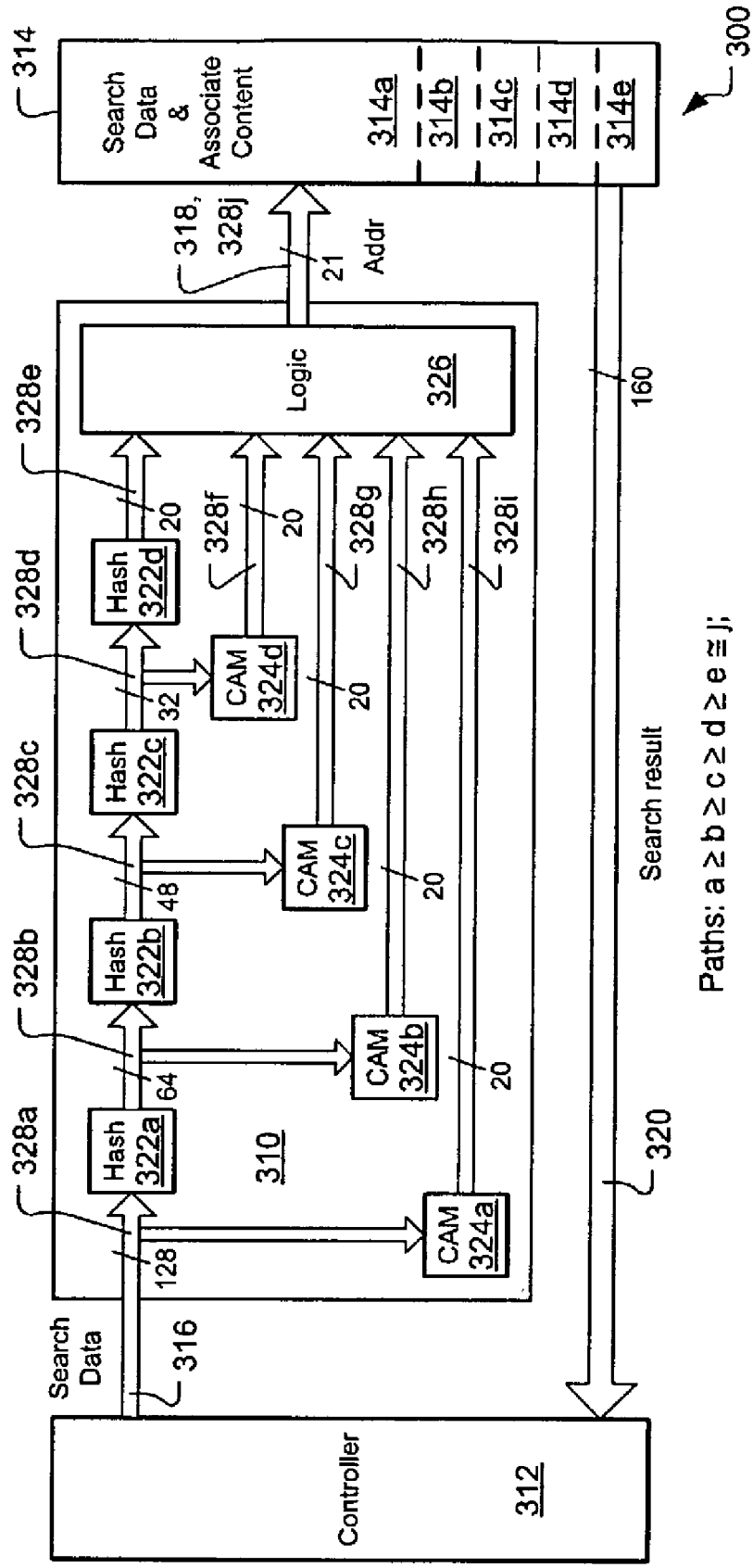
Figure 8:
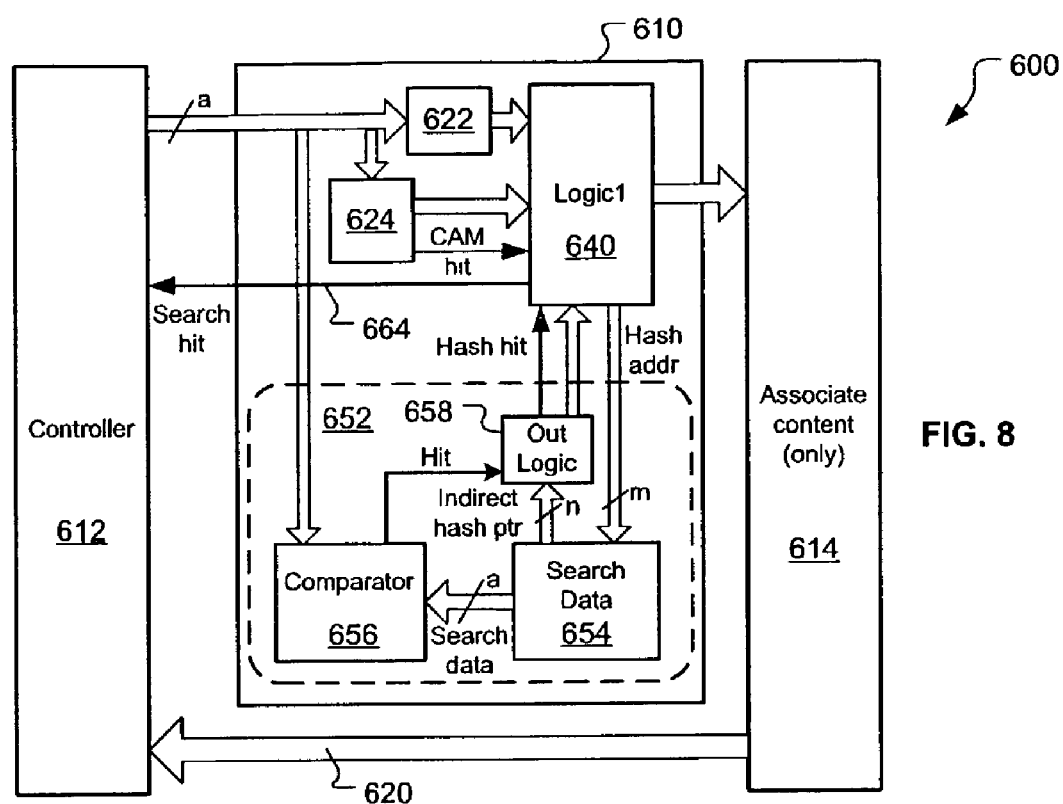
Figure 9A:
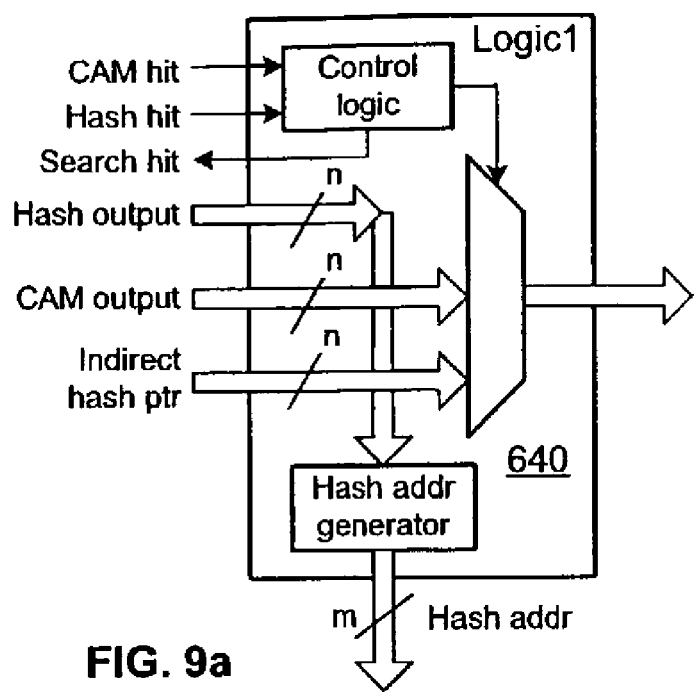
Figure 9B:
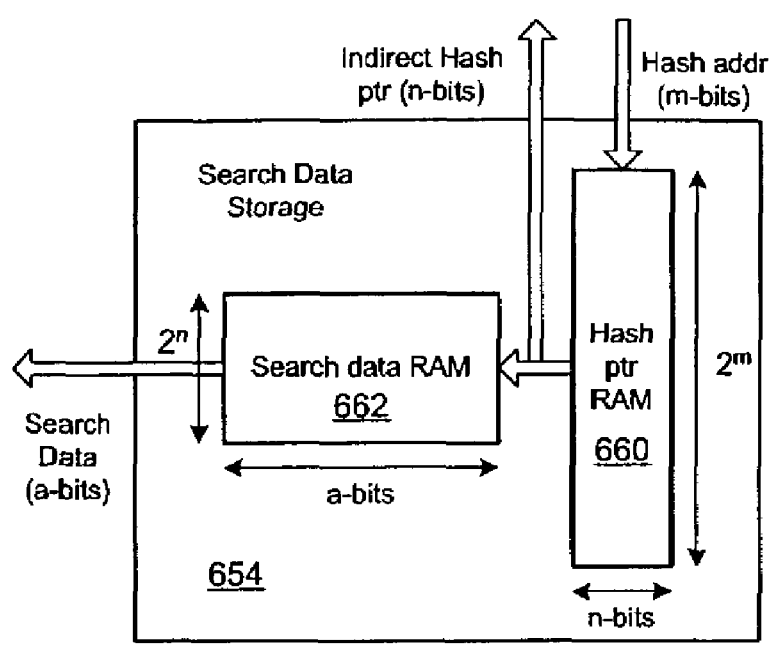
Figure 10:
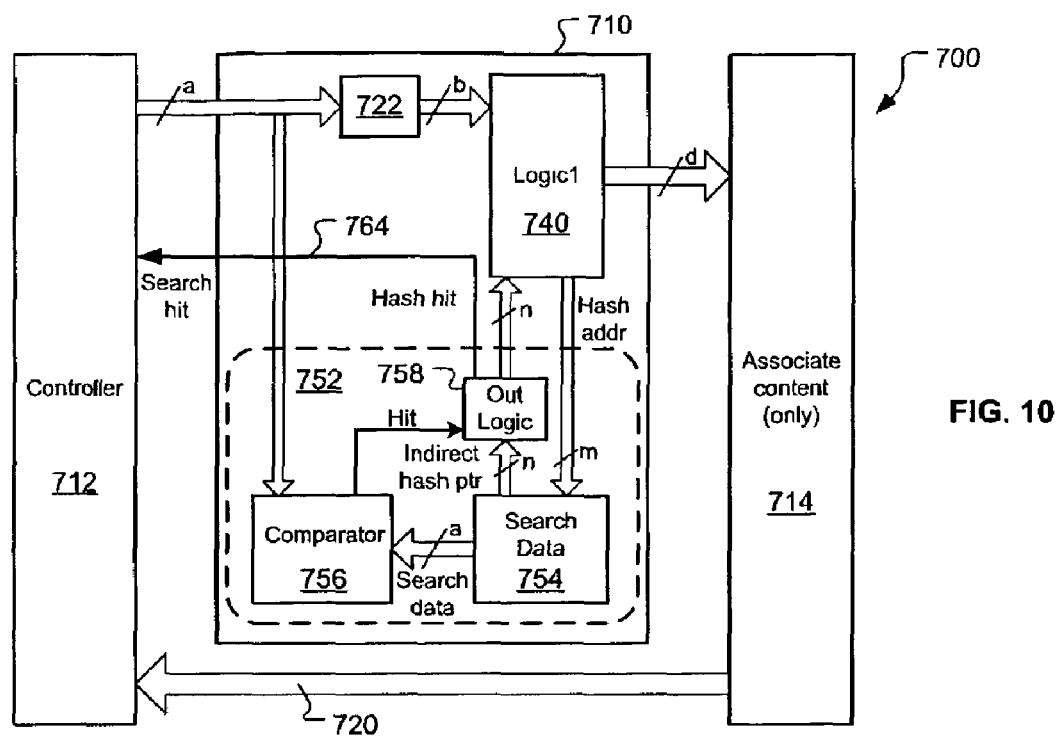
Figure 11A:
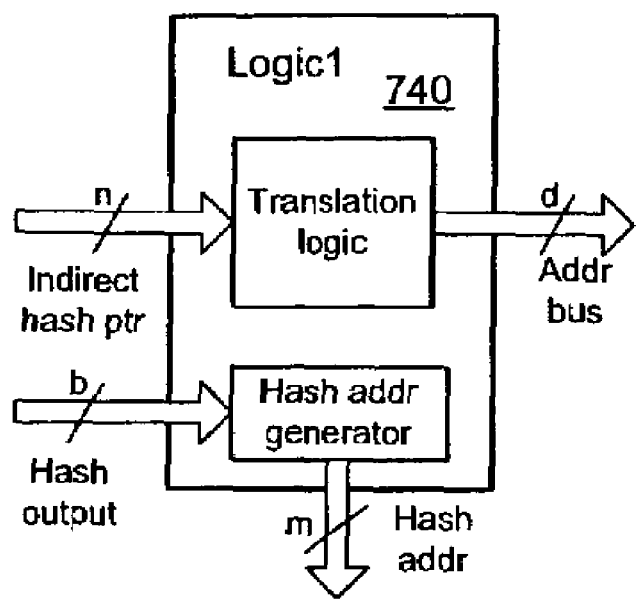
Figure 11B:
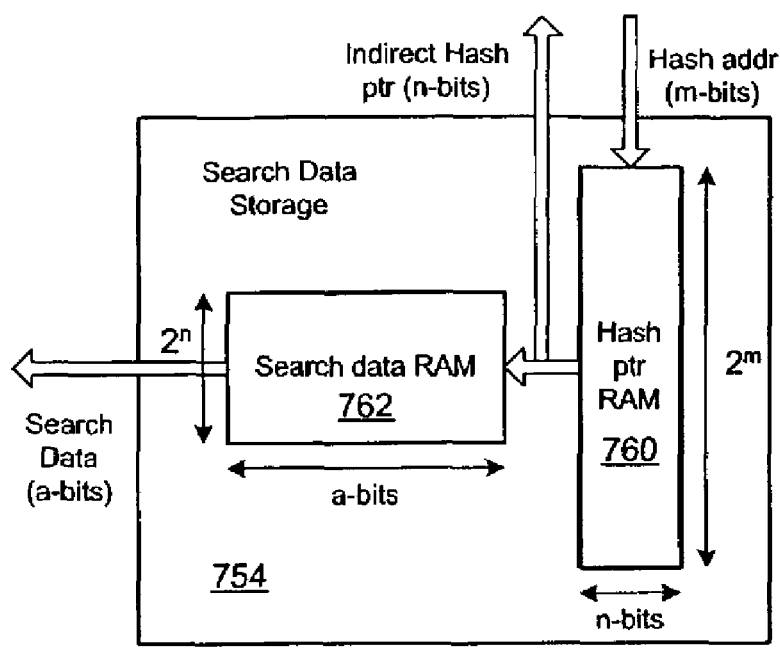
Figure 12:
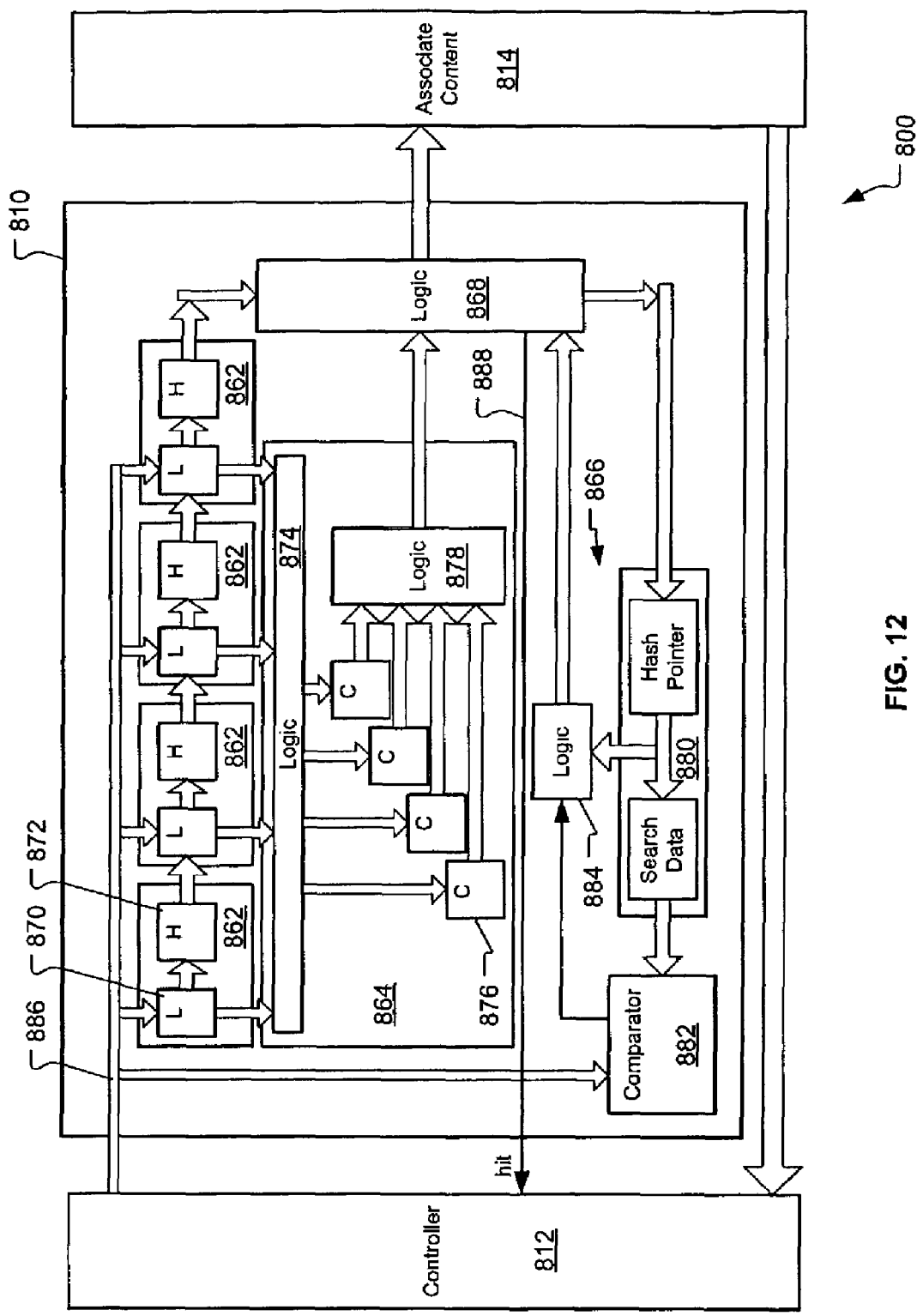
Figure 13:
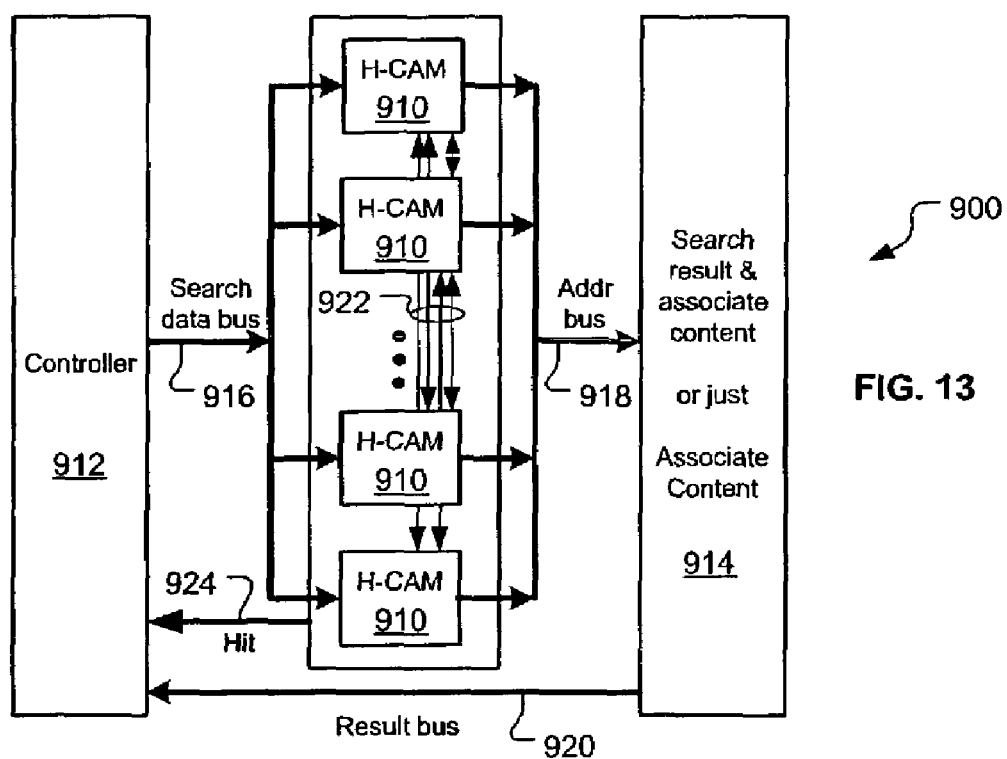
Figure 14:
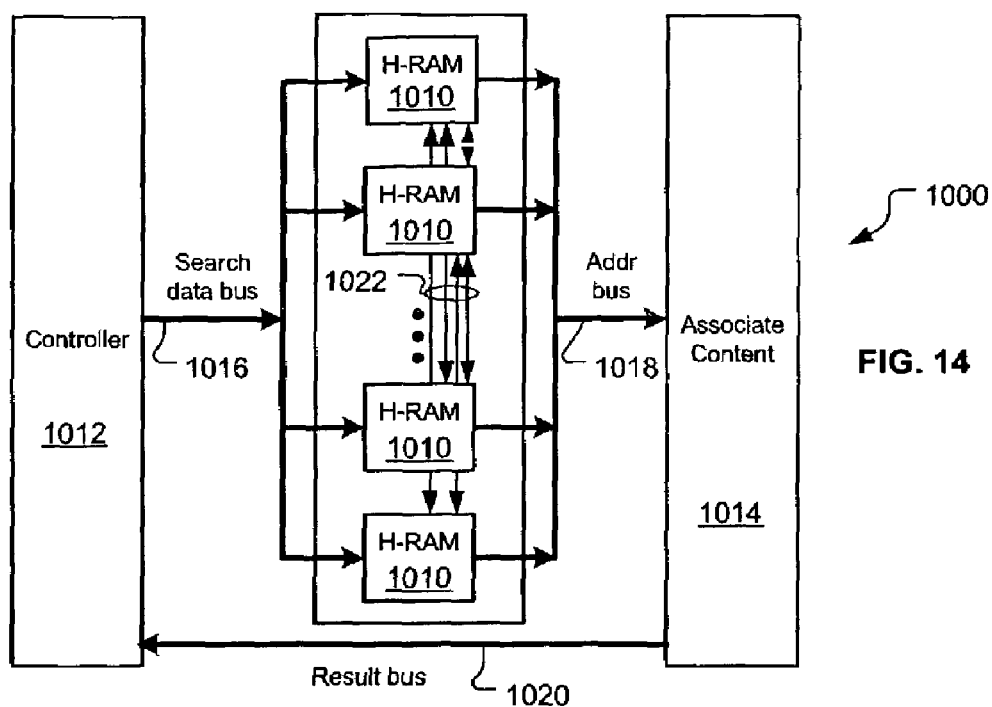
Figure 15:
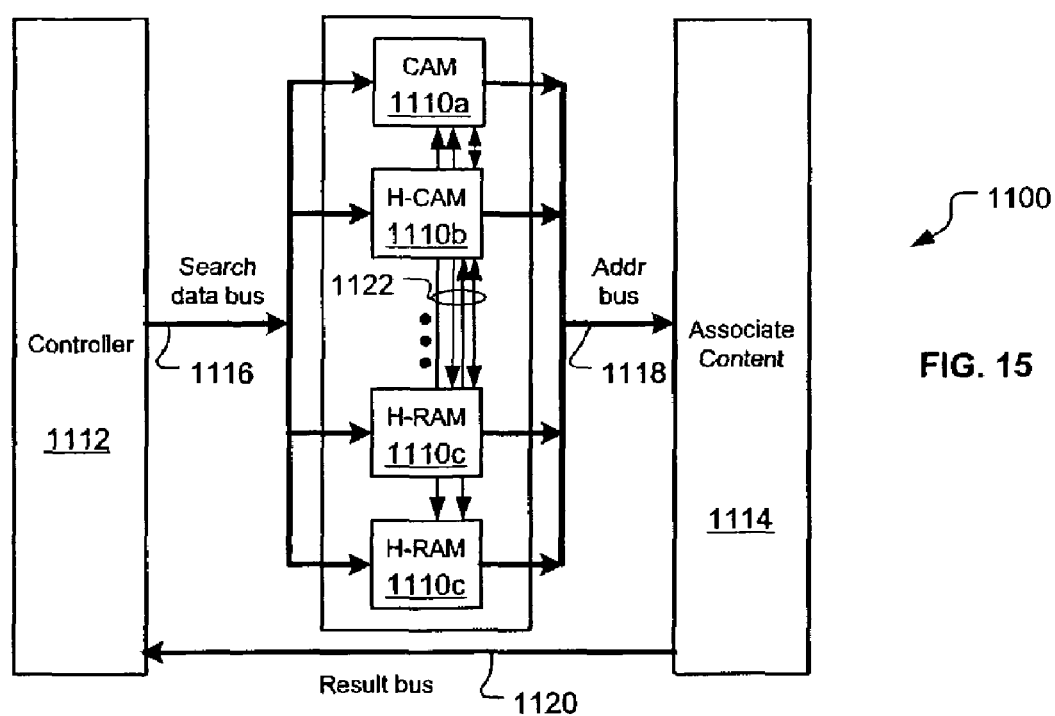

FIG. 1 (background art) is a block diagram depicting a simple hash-based database searching example;

FIG. 2 (background art) is a block diagram depicting a simple CAM-based database searching example;

FIG. 3 is a block diagram depicting a search engine according to a hash pointer based embodiment of the present invention;

FIG. 4 is a block diagram depicting a search engine according to a single-level hash-CAM based embodiment according to the invention;

FIG. 5 is a block diagram depicting a search engine according to a quad-level hash-CAM based embodiment of the invention;

FIG. 6 is a block diagram depicting a search engine used in an example of a multi-leveled architecture embodiment of the invention, simplified for use in a detailed exam pie;

FIG. 7 is a flow chart depicting a process suitable for use with the H-CAM element of the embodiment of the invention shown in FIG. 6;

FIG. 8 is a block diagram depicting a search engine according to an alternate embodiment of the invention, including a H-CAM element having a comparison section;

FIGS. 9a–b show possible sub-architectures for parts of the H-CAM element of the embodiment shown in FIG. 8, wherein FIG. 9a is a block diagram depicting an architecture for first a logic unit and FIG. 9b is a block diagram depicting an architecture for a search data storage;

FIG. 10 is a block diagram depicting a search engine according to an alternate embodiment of the invention, including a H-RAM element;

FIGS. 11a–b show possible sub-architectures for parts of the H-RAM element of the embodiment shown in FIG. 10, wherein FIG. 11a is a block diagram depicting an architecture for a first logic unit and FIG. 11b is a block diagram depicting an architecture for a search data storage;

FIG. 12 is a block diagram depicting a search engine incorporating many of the principals discussed for other embodiments;

FIG. 13 is a block diagram depicting a search engine having the ability to scale for use in large systems by cascading multiple H-CAM elements;

FIG. 14 is a block diagram depicting a search engine having the ability to scale for use in large systems by cascading multiple H-RAM elements; and FIG. 15 is a block diagram depicting a search engine having the ability to scale for use in large systems by cascading multiple CAM, H-CAM and H-RAM elements.

DETAILED DESCRIPTION

BEST MODE FOR CARRYING OUT THE INVENTION

A preferred embodiment of the present invention is a system for large database searches which marries both hash-based and CAM-based advantages without the respective disadvantages. As illustrated in the various drawings herein, and particularly in the views of FIG. 3–6, 8, 10, and 12–15, preferred embodiments of the invention are depicted by the general reference characters 100, 200, 300, 400, 500, 600, 700, 800, 900, 1000, and 1100.

A Search Engine Using a Hash Pointer

FIG. 3 is a block diagram depicting a search engine 100 according to one preferred embodiment of the present invention. The particularly novel aspect in this embodiment is the use of a hash pointer unit 110, which is interposed between a controller 112 and a memory 114. For an example here, lets say that the controller 112 uses 128-bit wide input search values to search a database of up to one million entries of 32-bit associate content value stored in the memory 114. The controller 112 includes a hash function 116 that generates hash addresses (which potentially may be hash collisions).

The controller 112 may be substantially the same as the conventional controller 12 discussed with FIG. 1 (background art). Unlike the scheme used in FIG. 1, however, lets use 4-way set-associativity here. Accordingly, using four way access to up to one million addresses, a 22-bit address bus 118 is needed to connect the controller 112 to the hash pointer unit 110.

The hash pointer unit 110 includes a 4M×20 memory which may contain programmable unique "pointers" to the one million potential entries in the memory 114. The hash pointer unit 110 is 4M deep to handle 4-way associativity to one million potential entries, but it need be only 20-bits wide to provide pointers able to access the actual one million potential entries in the memory 114. A 20-bit wide pointer bus 120 can therefore be used to connect the hash pointer unit 110 to the memory 114.

Since hash collisions are possible and must still be checked for, the memory 114 accordingly needs to include entries 160-bits wide (128+32). Individual such entries, or search results are then provided to the controller 112 via a 160-bit wide result bus 122.

The operation here is similar to that of the prior art search engine 10 in FIG. 1, except that the stored search values and associate content values are accessed "indirectly" through the pointer values stored in the hash pointer unit 110. A 128-bit input search value is used by the hash function 116 to generate a 20-bit hash output, which the controller 112 combines with an offset value to create a 22-bit hash address.

Any of many different schemes will work to convert the hash value to the hash address. For instance, the controller 112 may do this by prefixing a 2-bit offset value to the hash value. Thus, a "00" prefix can represent that the hash output maps to the first "way" in the 4-way set-association used here, a "01" can represent the second way, and so fourth. On a first try with a particular 128-bit input search value, "00" may be prefixed to the hash value. If the search result this produces has a stored search value that matches the original input search value, there has been no hash collision. In contrast, if these values do not match, a hash collision has occurred. Then "01" may be prefixed to the (same) hash value, creating a new hash address, and the hash pointer produced by the hash pointer unit 110 in response to this may similarly be used to retrieve a different search result. This can continue, handling up to four 128-bit input search values that the hash function maps to the same hash value in this embodiment.

Summarizing, the search speed issue (as termed in the Background Art section) is not changed. However, the memory size issue is greatly changed. Whereas a 4M×160 memory would be required using a prior art 4-way set-associative hash-based approach, the inventive search engine 100 here requires only a 1M×160 memory and a 4M×20 memory—a substantial overall savings.

A Single Level H-CAM and a Search Engine Employing it

FIG. 4 is a block diagram depicting a search engine 200 according to another preferred embodiment of the present invention. The particularly novel aspect of this embodiment is a single level H-CAM 210. The single level nature of the H-CAM 210 should not be confused with the set-associative nature of a hash approach. That is, the "level" and "way" are different concepts. The H-CAM 210 in the example here is 1way-set-associative, but that is coincidental with the use here of only a single level.

The search engine 200 further includes a controller 212 and a memory 214, which both may be substantially conventional. For instance, the controller 212 may be an application specific integrated circuit (ASIC) and the memory 214 may be an external random access memory (RAM).

The controller 212 communicates an input search value to the H-CAM 210, via a search data bus 216, and the H-CAM 210 then communicates an address value to the memory 214, via an address bus 218. Responsive to the address value, a result value is communicated back from the memory 214 to the controller 212, via a result bus 220.

As shown, the architecture of the H-CAM 210 includes a hash unit 222, a CAM unit 224, and a logic unit 226. The input search value is provided, via a first path 228a, to both the hash unit 222 and the CAM unit 224. The hash unit 222 then provides a hash output on a second path 228b, and the CAM unit 224 may (if it finds a match) provide a CAM output on a third path 228c (the address within it of such a match). The logic unit 226 receives the CAM and hash outputs, via the paths 228b–c, and selects one for use as the address value, which it then provides to the memory 214 via the address bus 218 (effectively a last path 228d).

The following is an example pertaining particularly to the search engine 200 depicted in FIG. 4. Lets assume here that the search engine 200 will also use 128-bit wide input search values, to search a database of up to one million entries of 32-bit associate values. The search data bus 216 is 128 bits wide, the address bus 218 is 21 bits wide, and the result bus 220 is 160 bits wide.

The hash unit 222 employs a hash algorithm to map each 128-bit wide input search value to a "narrow" 20-bit wide hash output value. Each input search value received by the hash unit 222 causes it to provide a respective hash output to the logic unit 226. Of course, the hash output will depend on the hash algorithm actually used.

The CAM unit 224 in this example is a 100K×128 content addressable memory. If an input search value is received in the CAM unit 224 that matches a stored comparison value (a 128-bit wide copy of a previous search value that caused a hash collision), the address of that match is provided by the CAM unit 224, as a CAM output, to the logic unit 226. In contrast, however, if an input search value is received which does not match any comparison value, no CAM output is provided.

The logic unit 226 here operates in a straight forward manner. A CAM output has higher priority than a hash output. If the logic unit 226 receives only a hash output, that becomes the basis of the address value. If it receives both a hash output and a CAM output, the CAM output becomes the basis of the address value. This is so because the presence of a CAM output indicates that there is an already known and cataloged hash collision case. Using the hash output for the address value here would cause that collision to occur. Alternately, using the CAM output for the address value instead will avoid that collision. If the logic unit 226 receives only a CAM output it can go ahead and use that as the basis for the address value. However, it may be desirable to treat this as an error condition in many embodiments, since a proper hash algorithm should always produce a hash output.

If necessary, the logic unit 226 also translates the hash or CAM output into an address value that appropriately maps to the memory 214. For instance, the hash output may (naturally or by translation) map to the low-order one million addresses in the memory 214. If the CAM output also maps to the low-order one-hundred thousand addresses in the memory, it needs to be translated to instead map to high-order addresses in the memory 214.

The memory 214 here includes a base region 214a for storing search results that are accessed based on the hash outputs, and a conflicts region 214b for storing search results that are accessed based on the CAM outputs. The search results in the base region 214a need to include a 128-bit wide stored search value and a 32-bit associate value, for reasons discussed presently. It then follows, because every possible hash output (defined by a 20-bit index value) must map to a search result, that the base region 214a in the example here needs to have a size of at least 1M×160.

The search results stored in the conflicts region 214b of the memory 214, however, do not have to include any stored search values. The CAM unit 224 already includes full 128-bit wide copies of these same search values it uses to index into the conflicts region 214b, and storing any stored search values in the conflicts region 214b is unnecessary and wasteful. The conflicts region 214b here can therefore simply contain the 32-bit associate values, and thus need only be 100K×32 in size.

The address bus 218, memory 214, and result bus 220 are stylistically shown in FIG. 4 in a manner to emphasize that the base region 214a and the conflicts region 214b may be different in size, and that they may even be distinct physical devices. The result bus 220 needs to be 160 bits wide to carry either size of result value, but a 128-bit field can be empty whenever a result value is taken from the conflicts region 214b.

The controller 212 receives a result value from the memory 214, and it may check for a new hash collision. The controller 212 can easily determine if the result value includes a stored search value. If not, the result value will have come from the conflicts region 214b and the 32-bit associate value in the present result value can be used with confidence that it is uniquely associated with the original input search value. In contrast, for a non-empty stored search value, the result value will have come from the base region 214a in the memory 214 and a hash collision is still a possibility that needs to be dealt with. The controller 212 can then compare the non-empty stored search value with the original input search value. If these are the same, no hash collision has occurred and the search engine 200 can simply carry on and use the 32-bit associate value in the present result value with confidence. However, if these values differ, a new hash collision has occurred and the associate value received as part of the result value should not be used. When a new hash collision is detected in this manner the search engine 200 specifically the CAM unit 224 and the conflicts region 214b of the memory 214, may be programmed to avoid it in the future. Theoretically, the search engine 200 here can handle hash collisions up to 100,001 deep in a worst case situation, since the conflicts region 214b has 100K locations to map collisions to after a first entry in the base region 214a has been used.

A Multi-Level H-CAM and a Search Engine Employing it

FIG. 5 is a block diagram depicting a search engine 300 according to another preferred embodiment of the present invention. The particularly novel aspect in this embodiment is a quad-level H-CAM 310. A controller 312 and a memory 314 are also provided.

In a manner much similar to the previous embodiment, the controller 312 here communicates an input search value to the H-CAM 310, via a search data bus 316, and the H-CAM 310 then communicates an address value to the memory 314, via an address bus 318. Responsive to the address value, a search result is then communicated back from the memory 314 to the controller 312 via a result bus 320.

As shown, the architecture of the H-CAM 310 includes a number of paired hash units (hash units 322a–d) and CAM units (CAM units 324a–d), and a single logic unit 326. The input search value is provided to the hash unit 322a and its paired CAM unit 324a, via a path 328a. The hash unit 322a then provides a first hash output on a path 328b, which conveys it to the next hash unit 322a where a second hash output is provided on a path 328c, and so forth until a last, fourth hash output is provided on a path 328e. Concurrently, the CAM unit 324a provides a first CAM output on a path 328i, a second CAM output is provided on a path 328h, and so forth until a last, fourth CAM output is provided on a path 328f. Summarizing, at this point there is a single final hash output on a path 328e and multiple CAM outputs on paths 328f–i, and all of these paths 328e–i lead to the logic unit 326. The logic unit 326 selects a value from those it receives to use as the address value, and provides it to the memory 314 via the address bus 318.

The following is an example particularly pertaining to the search engine 300 depicted in FIG. 5. Inside the H-CAM 310, the path 328a is 128 bits wide, as it is essentially the same as the search data bus 316; the path 328b is desirably smaller, say, 64 bits wide; the path 328c is desirably still smaller, say, 48 bits wide; the path 328d is desirably yet smaller, say, 32 bits wide; and the paths 328e–i are all smaller, specifically all 20 bits wide, as one of their contents is ultimately sent via the 21-bit wide address bus 318 (effectively a last path 328j).

The purpose of the multiple hash units 322a–d here is to reduce the input data space, hence the hash outputs should each desirably be smaller than the prior input. The multiple CAM units 324a–d store entries known to cause hash collisions at the respectively paired hash units 322a–d. The underlying rationale of this multi-level architecture is that when a given number of hash collisions are expected a corresponding number of CAM entries will be needed. So, based on probability and knowing that the width of the CAMs shrink at successive levels, using multiple levels of CAM in this manner should reduce the total amount of CAM require to provide for the expected number of hash collisions. Nevertheless, the actual number of hash collisions still depends on the particular pattern of input data encountered.

The logic unit 326 outputs an address value based on a highest priority scheme. the earlier CAM stages have higher priority over later stages, and ultimately over the hash output. For example, the CAM output of the first CAM unit 324a has higher priority than the CAM output of the second CAM unit 324b, and so forth, ending here with the CAM output of the fourth CAM unit 324d having priority over the hash output of the fourth hash unit 322d. The logic unit 326 may also, if necessary, translate the outputs to an address value that appropriately maps to the memory 314.

The memory 314 has a base region 314a, a first conflicts region 314b, a second conflicts region 314c, a third conflicts region 314d, and a fourth conflicts region 314e. As was discussed for the "highest" conflicts region 214b in FIG. 4, the fourth conflicts region 314e does not need to include room for stored search values, since the first CAM unit 324a contains a copy of the search value and will always match uniquely.

The hash output of the fourth hash unit 322d becomes the basis for address values that map to the base region 314a; the CAM output of the fourth CAM unit 324d becomes the basis for address index values that map to the first conflicts region 314b; the CAM output of the third CAM unit 324c becomes the basis for address index values that map to the second conflicts region 314c; and so forth. The conflicts regions 314b–e thus each store data to handle correspondingly higher level collision cases.

A Different Multi-Level H-CAM and Search Engine Employing it, in a Detailed Example FIG. 6 is a block diagram depicting a search engine 400 according to the present invention, now used in detailed example. A two-level H-CAM 410 is provided, along with a controller 412, memory 414, search data bus 416, address bus 418, and result bus 420.

A programming unit 430 is also shown here (and many embodiments of the invention will include programming capability, but is not described in particular detail since its task can be performed in various ways and using various architectures that are all substantially conventional or which should be readily apparent to those skilled in the art in view of the following discussion. The result bus 420 also differs from the result bus 220 (FIG. 4) in that it is bi-directional, and the memory 414 here accordingly accommodates that. Some variations of the programming unit 430 may employ these when programming the memory 414.

As shown, the architecture of the H-CAM 410 here includes a two hash units (hash units 422a–b) and two CAM units (CAM units 424a–b), and a logic unit 426. A path 428a connects the search data bus 416 to the first hash unit 422a and the first CAM unit 424a; a path 428b connects the first hash unit 422a to the second hash unit 422b and the second CAM unit 424b; a path 428c connects the second hash unit 422b to the logic unit 426; a path 428d connects the second CAM unit 424b to the logic unit 426; and a path 428e connects the first CAM unit 424a to the logic unit 426.

The memory 414 includes a base region 414a, a first conflicts region 414b, and a second conflicts region 414c. These might, for instance, respectively be 1M×160, 200K×160, and 100K×32 in size.

FIG. 7 is a flow chart depicting a process 500 suitable for use with the H-CAM 410 of FIG. 6. The process 500 starts with a step 510, where the two CAM units 424a–b and the memory 414 are empty. In a step 512 an input search value is provided by the controller 412 to the H-CAM 410. In a step 514 the input search value is received by and processed by the first hash unit 422a to generate a first hash output. In a step 516, the input search value is also received by and processed by the first CAM unit 424a to create a first CAM output (but only if there is a match). In a step 518 the first hash output is received by and processed by the second hash unit 422b to generate a second hash output. In a step 520, the first hash output is also received by and processed by the second CAM unit 424b to create a second CAM output (but, again, only if there is a match).

Summarizing, up to here the H-CAM 410 has internally produced a final (second) hash output, and possibly also either or both of first and second CAM outputs. Next, in a step 522 these outputs are received by and prioritized by the logic unit 426. The first CAM output receives the highest priority; if it is present it is used for the address value. The second CAM output receives the next priority; if it is present and the first CAM output is not, the second CAM output is used for the address value. The (final) second hash output receives the lowest priority; if it is present and the neither of the CAM outputs is, the second hash output is used for the address value. If necessary, the logic unit 426 also translates the respective output used so that the address value maps to a corresponding area in the memory 414.

In a step 524 it is determined whether a hit was detected in the first CAM unit 424a. If so, in a step 526 the first CAM output is used to access the memory 414 and the controller 412 will receive a search result (typically only an associate value) stored in the second conflicts region 414c. Since the contents of the second conflicts region 414c are always uniquely associated with possible input search values, the process 500 is essentially finished for the present input search value, and the search engine 400 can carry on with whatever further operations on the search result are desired.

If a hit was not detected in the first CAM unit 424a, in a step 528 it is determined whether a hit was detected in the second CAM unit 424b. If so, in a step 530 the first CAM output is used to access the memory 414 and the controller 412 receives a search result stored in the first conflicts region 414b.

There still remains a possibility, however, that the first hash output, upon which the second CAM output is based, is a new hash collision. Therefore, in a step 532 it is determined whether the stored search value in the returned search result is the same as the original input search value. If so, in a step 534 the process 500 is essentially finished for the present input search value, and the search engine 400 can carry on with whatever further operations on the search result are desired.

If the stored search value in the returned search result is not the same as the original input search value, in a step 536 the first CAM unit 424a can be programmed with the input search value and the second conflicts region 414c can be programmed with an associate value for this (all under direction of the programming unit 430). The process 500 is essentially finished for the present input search value.

If there were no CAM outputs (steps 524, 528), in a step 538 the second hash output is used to access the memory 414 and the controller 412 will receive a search result stored in the base region 414a.

In a step 540 the search result is examined to see if it contains any value. If so, there again still remains a possibility that the second hash output is a new hash collision, and in a step 542 the returned search result is compared with the original input search value.

In a step 544 it is determined whether these values are the same. If this is also so, in a step 546 the process 500 is essentially finished for the present input search value, and the search engine 400 can carry on with whatever further operations on the search result are desired.

In contrast, if the compared values are different, in a step 548 the second CAM unit 424b can be programmed with the first hash output and the first conflicts region 414b can be programmed with a search result (stored search value and associate value, all under direction of the programming unit 430). The process 500 is then essentially finished for the present input search value.

Lastly, if in step 540 it is determined that the search result is empty, in a step 550 a search result based on the input search value and an associate value for it may be programmed into the base region 414a of the memory 414, under direction of the programming unit 430. The process 500 is then essentially finished for the present input search value.

With reference now to FIGS. 6–7 and TABLE 2, an example is presented. By definition here the input search values are six-digits long and the associate values are two-digits long (base 10 numbers are also used here to facilitate understanding). The search data bus 416 and the path 428a are six-digit buses, the path 428b is a four-digit bus, and the paths 428c–e are all two-digit buses. The address bus 418 is a three-digit bus because it must carry the two-digit content of the second hash output when there are no hash collisions in the H-CAM 410, and also carry three digits otherwise (discussed presently).

Accordingly, the format 000:000000,00 can be used to reference the memory 414, wherein the three digits to the left of the colon represent an address index value, the six digits between the colon and comma represent a stored search value, and the two digits to the right of the comma represent an associate value.

The contents of the first CAM unit 424a can be represented using the format 000:000000, wherein the three digits to the left of the colon represent an address index value and the six digits to the right of the colon represent a comparison value equaling an input search value known to produce a collision in the first hash unit 422a. That is, the 6-digit comparison value is what is compared for a match and the 3-digit address value is associatively "stored" with it (typically in CAM, where this address is simply based on the storage location of the comparison value), to be used to avoid the hash collision by accessing an alternate location in the memory 414 (i.e., in the second conflicts region 414c).

The contents of the second CAM unit 424b can be represented using the format 000:0000, wherein the three digits to the left of the colon represent an address value and the four digits to the right of the colon represent a comparison value for a hash output known to produce a collision in the second hash unit 422b. That is, the 4-digit comparison value is what is compared for a match here and the 3-digit address value is associatively stored with it, to be used to avoid the hash collision here by accessing an alternate location in the memory 414 (i.e., in the first conflicts region 41 4b).

Initially (step 510), the CAM units 424a–b and the memory 414 have nothing stored in them. Typically all the values will be zero, but other conventions can be used. This state is represented in row 1 of TABLE 2.

A first search value is then entered, say, 324238 (step 512). The first hash unit 422a generates a first hash output, say, 7783 (step 514). With nothing stored yet in the first CAM unit 424a, it will not provide any first CAM output (step 516). The second hash unit 422b will generate a second hash result, say, 63 (step 518). With nothing stored yet in the second CAM unit 424b, it will not provide any second CAM output (step 520). The logic unit 426 therefore simply picks the second hash output, 63 (step 522). Using this address value, the memory 414 provides the content of address 63, which is nothing so far (step 538). This state is represented in row 2 of TABLE 2.

The controller 412 will determine that the first search value (324238) has no entry yet in the memory 414 (step 540). One is therefore created in the base region 414a using the search value and an associate value for it, say, 17. This entry is programmed into the memory 414 at address 63 (step 550), since that is what the hash units 422a–b here map the search value of 324238 to, and address 63 is presently available. This state is represented in row 3 of TABLE 2.

A second search value is entered, say, 578901. The first hash unit 422a will generate a first hash result, say, 6311. The second hash unit 422b will generate a second hash result, say, 63 again. With nothing stored yet in the CAM units 424a–b, they do not create any CAM outputs, and the logic unit 426 picks the second hash output, 63. Using this address value, the memory 414 provides the content of address 63, which is 324238, 17. This state is represented in row 4 of TABLE 2.

The controller 212 now determines that: the search value (578901) has a corresponding entry in the memory 414; a hash collision has occurred because the search field in the search result is different than the input search value used (324238≠578901) (step 542); and that this is a first level hash collision. An entry in the second CAM unit 424*b* is therefore created (step 548) using the first hash output (6311) and an available address for an entry in a conflicts region (here the first conflicts region 414*b*) of the memory 414, say, address 200. Furthermore, a new entry is also created in the memory 414, at address 100 in the first conflicts region 414*b* based on the search value (578901) and an associate value provided for it, say, 23. This state is represented in row 5 of TABLE 2.

A third search value is entered, say, 322413. The first hash unit 422*a* will generate a first hash output, say, 6311 again, which forces the second hash unit 422*b* to generate 63 as the second hash output. The first CAM unit 424*a* has no match for 322413, so there is no first CAM output. However, the second CAM unit 424*b* has a match for 6311, so it provides the associatively stored address index 100 as the second CAM output (step 520). The logic unit 426 evaluates its inputs and then picks the second CAM output, 100. Using this as the address value, the memory 414 provides the content of address 100, which is 578901, 23.

The controller 412 now determines that: the search value (322413) has a corresponding entry in the memory 414; a hash collision has occurred because the search field in the search result is different than the input search value used (324238≠322413); this is not a first level hash collision; and that this is a second level hash collision. An entry in the first CAM unit 424*a* is therefore created (step 536) using the search value (322413) and an available address for an entry in the conflicts region (here the second conflicts region 414*c*) of the memory 414, say, address 200. Furthermore, a new entry is also created in the memory 414, at address 200 in the second conflicts region 314*c* and based on the search value (322413) and an associate value provided for it, say, 86. No search value is required in the second conflicts region 414*c* the memory 41 4 because the first CAM unit 424*a* already contains it and it will always map uniquely (a dash represents this in TABLE 2). This state is represented in row 7 of TABLE 2.

A fourth search value is entered, say, 578901 again. The first hash unit 422*a* generates a first hash output of 6311, which forces the second hash unit 422*b* to generate 63 as the second hash output. The first CAM unit 424*a* has no a match for 578901, so there is no first CAM output. The second CAM unit 424*b* has a match for 6311, so the second CAM output is the associatively stored address index 100. The logic unit 426 evaluates its inputs and then picks the second CAM result, 100. Using this address value, the memory 414 provides the content of address 100, which is 578901, 23.

The controller 412 now determines that: the search value (578901) has a corresponding entry in the memory 414; and a new hash collision has not occurred because the search field in the search result is the same as the input search value used (578901=578901). No learning is therefore necessary and the contents of the associate value field, 23, can be used by the search engine 400. This state is represented in row 8 of TABLE 2.

A fifth search value is entered, say, 322413 again. The first hash unit 422*a* will generate a first hash output of 6311, which forces the second hash unit 422*b* to generate 63 as the second hash output. The first CAM unit 424*a* has a match for 322413, so the first CAM output is the associatively stored address index 200. The second CAM unit 424*b* also has a match for 6311, so the second CAM output is the associatively stored address index 100. The logic unit 426 evaluates its inputs and then picks the first CAM result, 200 (since a first CAM output gets highest priority). Using this as the address value, the memory 414 provides the content of address 200, which is –, 86 (recall that there are no stored search values in the highest order conflicts region).

The controller 412 now determines that: the search value (322413) has a corresponding entry in the memory 414; and a new hash collision has not occurred because the search field in the result is the same as the input search value used (322413=322413). No learning is therefore necessary and the contents of the associate value field, 86, can be used by the search engine 400. This state is represented in row 9 of TABLE 2.

Finally, a sixth search value is entered, say, 324238 again. The first hash unit 422*a* will generate a first hash output of 7783 again, which forces the second hash unit 422*b* to generate 63 again as the second hash output. The first CAM unit 424*a* has no match for 324238, so there is no first CAM output. The second CAM unit 424*b* has no match for 7783, so there also is no second CAM output. The logic unit 426 evaluates its inputs and then picks the second hash output, 63. Using this as the address value, the memory 414 provides the content of address 63, which is 324238, 17.

The controller 412 now determines that: the search value (324238) has a corresponding entry in the memory 414; and a new hash collision has not occurred because the search field in the search result is the same as the input search value used (324238=324238). No learning is therefore necessary and the contents of the associate value field, 17, can be used by the search engine 400. This state is represented in row 10 of TABLE 2.

A H-CAM Including a Hash Pointer and a Search Engine Employing it

FIG. 8 is a block diagram depicting a search engine 600 according to another preferred embodiment of the present invention. The particularly novel aspect here is a single level H-CAM 610 which employs a variation of the hash pointer (FIG. 3) to perform internal comparisons for detecting hash collisions. The H-CAM 610 works with a controller 612 and a memory 614. These may be substantially conventional, but are both different in some regards from the controller 212 and memory 214 (FIG. 4). In this embodiment the controller 612 does not need to receive any stored search values back for performing comparisons against original input search values (reducing its pin-count and footprint), and the memory 614 does not need to store the search values (reducing its size).

As shown in FIG. 8, the architecture of the H-CAM 610 is similar in some respects to the H-CAM 210 of FIG. 4. The H-CAM 610 includes a hash unit 622, a CAM unit 624, a first logic unit 640, and a comparison section 652. The salient difference is the comparison section 652, which includes a search data storage 654, a comparator 656, and a second logic unit 658.

With reference now also to FIGS. 9*a–b*, these depict possible internal architectures for the first logic unit 640 and the search data storage 654. FIG. 9*a* is a block diagram depicting one architecture for the first logic unit 640, wherein it receives the hash output, the CAM output, and also a CAM hit signal (the mere presence of a CAM output denotes a hit, of course, but using a separate signal provides some speed and logic design benefits). The first logic unit 640 connects to the search data storage 654 and provides it with a hash address based on the hash output.

FIG. 9b is a block diagram depicting an architecture for the search data storage 654, wherein it is broken into two memory blocks: a hash pointer memory 660 and a search data memory 662. Conceptually the hash pointer memory 660 works much like the hash pointer unit 110 discussed with reference to FIG. 3. The hash pointer memory 660 here receives the hash address and provides a pointer value. It thus has a size based on the number of ways of set-associativity used. The pointer value is then used as an address input to the search data memory 662, which here contains the stored search values that are used to compare with the original input search values to detect hash collisions. The hash pointer memory 660 typically will be much deeper (m>n in FIG. 9b) than the search data memory 662, because its purpose is to increase the utilization of the search data memory 662. Most of the hash pointer memory 660 will be empty but that is acceptable, since it is used to reduce the collision probability in the search data memory 662. With a proper memory depth ratio between the hash pointer memory 660 and the search data memory 662, the amount of the search data memory 662 required can be reduced.

As can be seen in FIG. 9a, the comparison section 652 provides the pointer value to the first logic unit 640 and it is what is ultimately used in this embodiment to access the base region of the memory 614. The second logic unit 658 passes the pointer value of a search to the first logic unit 640 (the mere presence of a value denotes a hit but using a separate signal, as is depicted, provides some speed and design benefits). Thus, if 4-way set-associativity is used the first logic unit 640 can provide four hash addresses to the comparison section 652 and it will provide up to one pointer value back. The controller 612 can then also be signaled, via a hit line 664, that the search result on the result bus 620 is a valid one.

With reference briefly again to TABLE 1, it also summarizes the difference between the prior art hash-based and CAM-based approaches and a simple embodiment of the invention depicted in FIG. 8, and FIGS. 9a–b. The specifications are essentially the same as for the prior art examples, except that a size of 128×100K is chosen for the CAM unit 624 based on an assumption that not more than 10% of the total database size need be devoted to handling hash collisions. As can be seen, the H-CAM 610 has the same speed as the prior art CAM-based approach. It has roughly the same total bus pin-count at the controller 612 as the prior art CAM-based approach (the hit line 664 may require as little as a single-pin) and it has a substantially lower pin-count than the prior art hash-based approach. This item bears some further comment. In the H-CAM 610 a result bus 620 can be as narrow as 32 bits wide, since it carries only the associate value. In contrast, the result busses 20, 220 have to be 160 bits wide to carry both the stored search value and associate value.

In TABLE 1 the H-CAM 610 is shown having roughly the same cost and power consumption as the prior art hash-based approach, but this is somewhat misleading. The H-CAM 610 here employs only 2-way set-associativity. If a higher degree of multi-way set-associativity is used additional cost and power savings can be had, providing the present invention with even greater advantage over the hash-based and CAM-based prior art.

For an example lets now consider a 4-way set-associative case wherein 128-bit wide search values are used to search a database of one million entries. The memory 614 needs to be 1M×32 in size, to handle only the one million desired entries (100% utilization is possible because using the pointer values are used). Furthermore, since a high percentage of hash collisions can be handled by the use of multi-way set-associativity, the CAM unit 624 can be small, say, only 32K×128 in size. It should particularly be noted that increasing the degree of multi-way set-associativity in this manner permits the CAM unit 624 to become decreasingly small, almost trivially small. This is very beneficial if actual content associative type memory is used (typically necessary where high speed is desired). Such true CAM requires more die area and consumes more power than most other types of memory, and usually is much more expensive. Reducing the amount of CAM used is therefore desirable.

Continuing with the example, the hash pointer memory 660 needs to be 4M×20 and the search data memory 662 needs to be 1M×128. The hash addresses need to be 22-bits wide, to address the four million locations in the hash pointer memory 660. The pointer values are 20-bits wide, since they only need to address the entries (associate content) in the memory 614 and to also address the one million entries (stored search values) in the search data memory 662. The total memory required in the example above is equivalent to 4M×61 (1M×32+32K×128+4M×20+1M×128), which is a marked reduction from the 4M×160 a conventional 4-way set associative approach would require.

There are many different ways to implement the comparison section 652, and the architecture of these (and the hash algorithm) play an important role in overall efficiency. If designed correctly, this approach is able to reduce the total amount of memory (CAM and other) required. As can be seen in TABLE 1, this can produce a substantial cost savings. Basically, two things can be improved. The first is the handling of hash collisions by using a multi-way set associative hash, and the other is to reduce the depth of the search data storage 654, because the search values are usually very wide.

A H-RAM and a Search Engine Employing it

FIG. 10 is a block diagram depicting a search engine 700 according to another preferred embodiment of the present invention. The particularly novel aspect here is a H-RAM 710 which also employs a variation of the hash pointer (FIG. 3) to perform internal comparisons for detecting hash collisions. The H-RAM 710 works with a controller 712 and a memory 714. As was the case for the H-CAM 610 of FIG. 8, these may be substantially conventional. The controller 712 here also does not need to receive any stored search values back for performing comparisons (reducing its pin-count and footprint), and the memory 714 here also does not need to store the search values (reducing its size).

As shown in FIG. 10, the architecture of the H-RAM 710 is notable in that it does not employ a CAM. The underlying rationale here is that if a sufficiently high degree of multi-way set associativity is provided, CAM is not needed to address hash collisions.

The H-RAM 710 includes a hash unit 722, a first logic unit 740, and a comparison section 752. The comparison section 752 includes a search data storage 754, a comparator 756, and a second logic unit 758.

With reference now also to FIGS. 11a–b, FIG. 11a is a block diagram depicting one possible internal architecture for the first logic unit 740 and FIG. 11b is a block diagram depicting one possible internal architecture for the search data storage 754. Turning first to FIG. 11a, the first logic unit 740 here is simpler than the first logic unit 640 and in FIG. 9a. It converts the (n-bit) hash output into (m-bit) hash addresses, and it performs any desired translation of the (n-bit) indirect hash pointer into the address value for use with the memory 714.

As can be seen by comparing FIG. 11b with FIG. 9b, the search data storage 754 and the search data storage 654, and for that matter the comparison section 752 and the comparison section 652, may be essentially the same.

A Multi-Level H-CAM With Routing Logics, and a Search Engine Employing it

FIG. 12 is a block diagram depicting a search engine 800 according to another preferred embodiment of the present invention, an embodiment incorporating many of the principals so far discussed into a H-CAM 810. A controller 812 and memory 814 (potentially the same as those used in the embodiments of FIGS. 8 and 10) are present again and key points to note are in the architecture of the H-CAM 810.

The H-CAM 810 here includes hash blocks 862, a CAM block 864, a comparison section 866, and a main logic unit 868. The hash blocks 862 each include a paired input logic sub-unit 870 and hash unit 872. The CAM block 864 includes an input logic sub-unit 874, a number of CAM units 876 (typically equal in number to the hash blocks 862), and an output logic sub-unit 878. The comparison section 866 includes a search data storage 880, a comparator 882, and an output logic sub-unit 884.

The input logic sub-units 870 of the hash blocks 862 route data off of a common input path 886 into the individual hash block 862 or onward to the CAM block 864, or route the output data from a prior hash block 862 in similar manner. The input logic sub-unit 874 of the CAM block 864 routes data into the CAM units 876, and the output logic sub-unit 878 combines and routes data from the CAM units 876. The output logic sub-unit 884 of the comparison section 866 combines and routes data from the comparison section 866. The data received from the last hash block 862, the output logic sub-unit 878 of the CAM block 864, and the output logic sub-unit 884 of the comparison section 866 is used by the main logic unit 868, which outputs information to the comparison section 866, to the memory 814, and to the controller 812, via a hit line 888.

The H-CAM 810 can be user configured to work as a 4-level unit, much in the manner described for the H-CAM 310 in FIG. 5; or it can be configured to work as a 2-level unit, much in the manner described for the H-CAM 410 in FIG. 6; or it can be configured to work as a 1-level unit, much in the manner described for the H-CAM 210 in FIG. 4. In particular, it can be configured to work as a 1-level unit similar to the H-CAM 610 and which operates on very large data. The hash blocks 862 can be configured to each handle part of a wide input on the common input path 886, in parallel, or they can be operated in serial fashion as has essentially been described elsewhere herein. The CAM block 864 can handle either case, with its input logic subunit 874 and its output logic sub-unit 878 configurable to use the CAM units 876 as one effective large CAM or as smaller amounts of CAM. The comparison section 866 and its output logic sub-unit 884 are similarly configurable to work with the configuration of the other components.

Cascading in a Search Engine, Shown With H-CAMS

FIG. 13 is a block diagram depicting a search engine 900 according to another preferred embodiment of the present invention, an embodiment employing the ability to scale for large needs by cascading multiple H-CAMs 910 to form a bigger overall system. If the internal architecture of the H-CAMs 910 generally resembles that of the H-CAMs 210, 310, 410, and an expansion bus 922 is added, a controller 912, memory 914, search data bus 916, address bus 918, and result bus 920 may be used which are essentially similar to those used there with. Alternately, if the internal architecture of the H-CAMs 910 resembles that of the H-CAMs 610, 810, and the expansion bus 922 is added, the controller 912, memory 914, result bus 920, and a hit line 924 may be used which are essentially similar to those used there with. The memory 914 may accordingly store the search data values and the associate content values or just the associate content values.

These architectures combines all the benefits of hash algorithm and CAM to provide an efficient and cost effective way to support searching large databases. The search engine 900 can support very large database searching without using large amounts of memory to accommodate possible hash collisions, yet it can achieve the same search performance as prior art CAM-based approaches without the attendant high cost and power consumption. Although this approach cannot guarantee a specific capacity to avoid hash collisions, similar to prior art hash-based approaches, with the proper hash algorithm and number of ways of set-associativity this variation of the invention can nonetheless achieve very high utilization. This coincides well with a key goal of the present invention, to increase the degree or number of ways of set-associativity without increasing the memory speed or the bandwidth requirement.

A cascaded approach makes use of the power of distributed processing. If each H-CAM supports an n-way-set-associative hash, the entire system would be able to support (n×number of H-CAM)-way-set associative hash. Multiple H-CAMs, such as the H-CAM 610 shown in FIG. 8, can be cascaded together, such as through the expansion bus 922 as shown in FIG. 13. If n=2 and five H-CAMs are cascaded together, the system can employ a 10-way-set-associative hash and the hash pointer memory and the search data memory within each H-CAM need to only support two reads per input search value, instead of the ten that would be needed in a typical prior art 10-way-set-associative hash approach.

TABLE 3 provides a comparison of two different implementations of a one million entry 8-way-set-assoicative hash-based system. One uses a typical prior art hash-based approach, while the other uses the H-CAM with the indirect hash pointer and a cascading mechanism. If each H-CAM supports a 2-way-set-associative hash, four are needed to implement this. Each H-CAM will have 256K entries in the search data memory and 512K pointers in the hash pointer memory. Further assuming each search data entry is 128-bits wide, it can be seen that the inventive approach uses only about one-sixth of the memory and requires only one-fourth of the memory bandwidth.

Cascading in a Search Engine, Shown With H-RAMS

FIG. 14 is a block diagram depicting a search engine 1000 according to another preferred embodiment of the present invention, an embodiment employing the ability to scale for large needs by cascading multiple H-RAMs 1010. In structure the search engine 1000 here much resembles the search engine 900 of FIG. 13, a controller 1012, memory 1014, search data bus 1016, address bus 1018, and result bus 1020 are provided, and an expansion bus 1022 is used to interconnect the H-RAMs 1010.

Cascading in a Search Engine, Shown With Cams, H-CAMS and H-RAMS in Combination

FIG. 15 is a block diagram depicting a search engine 1100 according to another preferred embodiment of the present invention, an embodiment employing the ability to scale for large needs by cascading multiple of CAMs 1110a, H-CAMs 1110b, and H-RAMs 1110c, with a controller 1112, memory 1114, search data bus 1116, address bus 1118, and result bus 1120 and all interconnected by an expansion bus 1122. The search engine 1100 thus is particularly powerful and configurable to various applications, including searching very large and highly specialized databases.

Summary

A lot has been presented herein. The prior art hash approach was discussed, including multi-way set-associativity (see e.g., FIG. 1 (background art)), and the prior art CAM approach was also discussed (see e.g., FIG. 2 (background art)). A novel hash pointer approach was then discussed (see e.g., FIG. 3), including how it provides the benefits of multi-way set-associativity without the poor memory utilization that is characteristic of the prior art.

A novel H-CAM approach was next discussed, with coverage of it including how it provides many of the benefits of the respective hash and CAM approaches, but without many of the respective disadvantages. FIG. 4 depicted a single level H-CAM variation, and FIG. 5 depicted a multi level H-CAM variation. Both of these examples use 1-way set-associativity, for simplicity, but using multi-way set-associativity is a straight forward extension. FIG. 6 covered programming, which is essentially also straight forward and possible with generally conventional techniques, and FIG. 6 and the flow chart of FIG. 7 were used in a detailed example.

A novel "local" comparison approach for moving the task of comparison into the H-CAM was discussed (see e.g., FIGS. 8 and 9a–b), employing a variation of the hash pointer approach (FIG. 3). As is the case with just the hash pointer approach, this local comparison approach provides particular benefit when used with multi-way set-associativity.

A novel H-RAM approach was then discussed, one which uses a variation of the local comparison approach (see e.g., FIGS. 10 and 11a–b). Enhancing the multi level H-CAM by using internal routing logics was also discussed, with optional local comparison included (see e.g., FIG. 12). Finally, cascading multiple H-CAMs, cascading multiple H-RAMs, and cascading multiple CAMs, H-CAMs, and H-RAMs together in combination were shown (FIGS. 13–15).

Accordingly, while various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present search engines 100, 200, 300, 400, 600, 700, 800, 900, 1000, 1100, and the individual H-CAMs 210, 310, 410, 610, and 810 and the individual H-RAM 710 are well suited for application in the searching of databases of associate content. The search engines, H-CAMs, and H-RAM can search large databases, particularly when variations such as the configurable embodiment depicted in FIG. 12 or the cascade able embodiments depicted in FIGS. 13–15 are used.

The invention can substantially reduce the memory needed for database storage. The embodiment depicted in FIG. 3 shows how the invention permits memory size to not be based on the degree of multi-way set-associativity used. The embodiments depicted in FIGS. 4–6 show how database memory may also be reduced by not storing instances of the search values in a highest level conflicts region in the main memory, and the embodiments depicted in FIGS. 8–12 show how database memory may be reduced to store only associate content, and then with a very high degree of utilization.

The invention can also substantially reduce the time needed for conducting database searches. While the embodiments depicted in FIGS. 3–6 show that the invention can at least equal the search speed of hash-based prior art approaches, the more sophisticated embodiments depicted in FIGS. 8–11 show how the invention can better the search speed of hash-based prior art approaches and approach the speed of CAM-based prior art approaches.

The invention can also substantially reduce the overall search engine and database storage system cost. This is achieved directly by increasing memory utilization, and thus reducing the need for memory. Cost reduction is also further achieved indirectly, by reducing bus widths, pin counts, circuit foot print, power consumption (and dissipating heat), etc.

For the above, and other, reasons, it is expected that the present invention will have widespread industrial applicability. Therefore, it is expected that the commercial utility of the present invention will be extensive and long lasting.

The invention claimed is:

1. A search engine, comprising:
 a controller to provide a search value representing a search result;
 a memory to store a search database of said search results and to provide instances of said search results to said controller;
 a hash-CAM sub-circuit (H-CAM) including:
  a hash unit to receive said search value from said controller and generate a hash output based there on;
  a CAM unit to store a CAM database of instances of said search values known to cause hash collisions in said hash unit, to receive said search value from said controller, and to match said search value against said CAM database such that a CAM output is provided if a match exists; and
  a logic unit to receive said hash output and said CAM output, to create an address value based on said CAM output if a said match exists and otherwise to create said address value based on said hash output, and to provide said address value to said memory, wherein said address value represents an address in said memory, thereby permitting detection and resolution of hash collisions when searching said search database of said search results in said memory.

2. The search engine of claim 1, wherein said hash unit is programmable to employ different hash algorithms.

3. The search engine of claim 1, wherein said controller is further to program said CAM unit with new entries in said CAM database, thereby permitting programming to detect and resolve new hash collisions.

4. The search engine of claim 1, wherein said logic unit is further to create a hash address based on a hash value and an offset value, and to instead create said address value based on a pointer value and a hash hit signal, and said H-CAM further includes:
  a search data storage to store a plurality of hash pointer values and a plurality of search data values, wherein said hash pointer values represent instances of said hash outputs and said search data values represent instances of said search values;
  said search data storage further to receive said hash address from said logic unit, to retrieve a said hash pointer value based on said hash address, to provide said hash pointer value to said logic unit as said pointer value, and to retrieve a said search data value based on said hash pointer value; and
  a comparator to receive and compare said search value and said search data value to determine whether a match exists, and, if a said match exists, to provide said hash hit signal to said logic unit, thereby permitting said memory to not store any instances of said search values in said search database yet still permit the search engine to detect and resolve hash collisions.

5. The search engine of claim 4, wherein said logic unit is further to generate a search hit signal based on said hash hit signal and whether a said match exists in said CAM unit, and to provide said search hit signal to said controller.

6. A search engine, comprising:
  a controller to provide a search value representing a search result;
  a memory to store a search database of said search results and to provide instances of said search results to said controller;
  a hash-CAM (H-CAM) sub-circuit including:
    a plurality of hash units each to receive an input value and generate a hash value based there on, wherein the first said input value is said search value and the last said hash value is a hash output;
    a plurality of CAM units equaling said hash units, whereby each respective said CAM unit is definable as having a paired said hash unit; and
    said CAM units to each store a CAM database of instances of said input values known to cause hash collisions in its paired said hash unit, to receive a said input value common with its paired said hash unit, to match said input value against its said CAM database, and to provide a CAM output if a match exists; and
    a logic unit to receive said hash output and said CAM outputs and create an address value based there on, and to provide said address value to said memory, wherein said address value represents an address in said memory, thereby permitting detection and resolution of hash collisions when searching said search database of said search results in said memory.

7. The search engine of claim 6, wherein said hash unit is programmable to employ different hash algorithms.

8. The search engine of claim 6, wherein said controller is further to program said CAM unit with new entries in said CAM database, thereby permitting programming to detect and resolve new hash collisions.

9. The search engine of claim 6, further comprising:
  a plurality of hash input logics, one per said hash unit, selectively to route said input values to their respective hash units and said CAM units;
  a CAM input logic to selectively route said input values to said plurality of CAM units; and
  a CAM output logic to selectively combine said CAM outputs, thereby permitting configurable application of said pluralities of said hash units and said CAM units.

10. The search engine of claim 6, wherein said logic unit is further to create a hash address based on said hash value and an offset value, and to instead create said address value based on a pointer value and a hash hit signal, and said H-CAM further includes:
  a search data storage to store a plurality of hash pointer values and a plurality of search data values, wherein said hash pointer values represent instances of said hash outputs and said search data values represent instances of said search values;
  said search data storage further to receive said hash address from said logic unit, to retrieve a said hash pointer value based on said hash address, to provide said hash pointer value to said logic unit as said pointer value, and to retrieve a said search data value based on said hash pointer value; and
  a comparator to receive and compare said search value and said search data value to determine whether a match exists, and, if a said match exists, to provide said hash hit signal to said logic unit, thereby permitting said memory to not store any instances of said search values in said search database yet still permit the search engine to detect and resolve hash collisions.

11. The search engine of claim 10, wherein said logic unit is further to generate a search hit signal based on said hash hit signal and whether a said match exists in said CAM unit, and to provide said search hit signal to said controller.

12. The search engine of claim 10, further comprising:
  a plurality of hash input logics, one per said hash unit, selectively to route said input values to their respective hash units and said CAM units;
  a CAM input logic to selectively route said input values to said plurality of CAM units; and
  a CAM output logic to selectively combine said CAM outputs, thereby permitting configurable application of said pluralities of said hash units and said CAM units.

13. The search engine of claim 12, further comprising a plurality of said H-CAMs, thereby pemiitting cascading configurable application of said plurality of said H-CAMs and said pluralities of said hash units and said CAM units there in.

14. A search engine, comprising:
  controller means for controlling the search engine and for providing a search value representing a search result;
  memory means for storing a search database of said search results and for providing instances of said search results to said controller means;
  a hash-CAM (H-CAM) including:
    hash means for receiving said search value from said controller means and for generating a hash output based there on;
    CAM means for storing a CAM database of instances of said search values known to cause hash collisions in said hash means, for receiving said search value from said controller means, and for matching said search value against said CAM database such that a CAM output is provided if a match exists; and
    logic means for receiving said hash output and said CAM output, for creating art address value based on said CAM output if a said match exists and otherwise for creating said address value based on said hash output, and for providing said address value to said memory means, wherein said address value represents an address in said memory means, thereby permitting detection and resolution of hash collisions when searching said search database of said search results in said memory means.

15. The search engine of claim 14, wherein said hash means is programmable to employ different hash algorithms.

16. The search engine of claim 14, wherein said controller means is further for programming said CAM means with new entries in said CAM database, thereby permitting programming to detect and resolve new hash collisions.

17. The search engine of claim 14, wherein said logic means is further for creating a hash address based on said hash value and an offset value, and for instead creating said address value based on a pointer value and a hash hit signal, and said H-CAM further includes:
  search data storage means for storing a plurality of hash pointer values and a plurality of search data values, wherein said hash pointer values represent instances of said hash outputs and said search data values represent instances of said search values;
  said search data storage further for receiving said hash address from said logic unit, for retrieving a said hash pointer value based on said hash address, for providing said hash pointer value to said logic means as said pointer value, and for retrieving a said search data value based on said hash pointer value; and
  comparator means for receiving and comparing said search value and said search data value to determine whether a match exists, and, if a said match exists, for providing said hash hit signal to said logic means, thereby permitting said memory means to not store any instances of said search values in said search database yet still permit the search engine to detect and resolve hash collisions.

18. The search engine of claim 17, wherein said logic means is further for generating a search hit signal based on said hash hit signal and whether a said match exists in said CAM means, and for providing said search hit signal to said controller means.

19. A search engine, comprising:
  controller means for providing a search value representing a search result;
  memory means for storing a search database of said search results and for providing instances of said search results to said controller means;
  a hash-CAM (H-CAM) including:
    a plurality of hash means for receiving an input value and for generating a hash value based there on, wherein the first said input value is said search value and the last said hash value is a hash output;
    a plurality of CAM means equaling said hash means, whereby each respective said CAM means is definable as having a paired said hash means; and
    said CAM means for each storing a CAM database of instances of said input values known to cause hash collisions in its paired said hash means, for receiving a said input value common with its paired said hash means, for matching said input value against its said CAM database, and for providing a CAM output if a match exists; and
    logic means for receiving said hash output and said CAM outputs and creating an address value based there on, and for providing said address value to said memory means, wherein said address value represents an address in said memory means thereby permitting detection and resolution of hash collisions when searching said search database of said search results in said memory means.

20. The search engine of claim 19, wherein said hash means is programmable to employ different hash algorithms.

21. The search engine of claim 19, wherein said controller means is further for programming said CAM means with new entries in said CAM database, thereby permitting programming to detect and resolve new hash collisions.

22. The search engine of claim 19, further comprising:
  a plurality of hash input logic means, one each per said hash means, for selectively routing said input values to their respective hash means and to said CAM means;
  CAM input logic means for selectively routing said input values to said plurality of CAM means; and
  CAM output logic means for selectively combining said CAM outputs, thereby permitting configurable application of said pluralities of said hash means and said CAM means.

23. The search engine of claim 19, wherein said logic means is further for creating a hash address based on said hash value and an offset value, and for instead creating said address value based on a pointer value and a hash hit signal, and said H-CAM further includes:
  search data storage means for storing a plurality of hash pointer values and a plurality of search data values, wherein said hash pointer values represent instances of said hash outputs and said search data values represent instances of said search values;
  said search data storage means further for receiving said hash address from said logic means, for retrieving a said hash pointer value based on said hash address, for providing said hash pointer value to said logic means as said pointer value, and for retrieving a said search data value based on said hash pointer value; and
  comparator means for receiving and comparing said search value and said search data value to determine whether a match exists, and, if a said match exists, for providing said hash hit signal to said logic means, thereby permitting said memory means to not store any instances of said search values in said search database yet still permit the search engine to detect and resolve hash collisions.

24. The search engine of claim 23, wherein said logic means is further for generating a search hit signal based on said hash bit signal and whether a said match exists in said CAM means, and for providing said search hit signal to said controller means.

25. The search engine of claim 23, further comprising:
  a plurality of hash input logic means, one per said hash unit, for selectively routing said input values to their respective hash means and to said CAM means;
  CAM input logic means for selectively routing said input values to said plurality of CAM means; and
  CAM output logic means for selectively combining said CAM outputs, thereby permitting configurable application of said pluralities of said hash means and said CAM means.

26. The search engine of claim 25, further comprising a plurality of said H-CAMs, thereby pennitting cascading configurable application of said plurality of said H-CAMs and said pluralities of said hash means and said CAM means there in.

* * * * *